May 21, 1963  D. ALBANESE ET AL  3,090,957
AIRCRAFT GUIDING SYSTEM
Filed Nov. 12, 1959  2 Sheets-Sheet 1
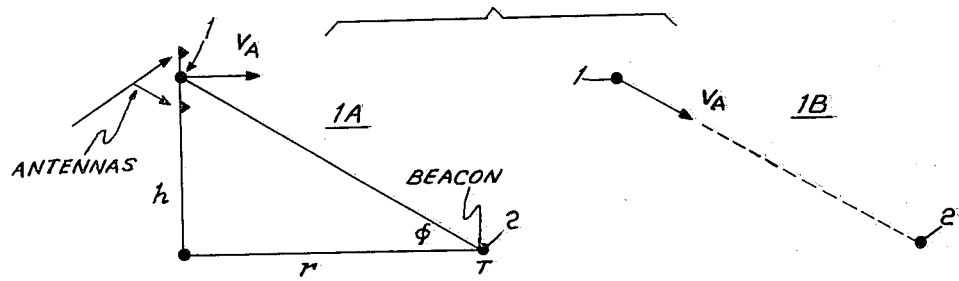
Fig. 1
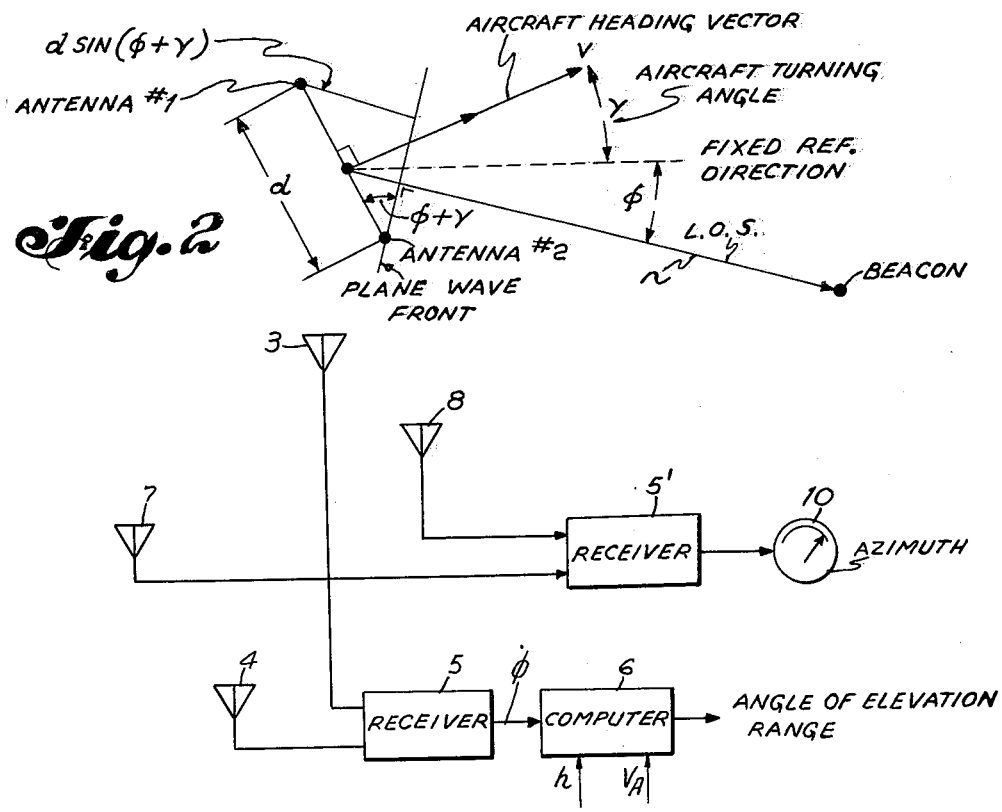
Fig. 2
Fig. 3
INVENTORS.
DAMIAN ALBANESE
FREDERICK BEISEL, JR.
BY JOHN KEARNEY
EUGENE NORTON, JR.
ATTORNEY

3,090,957
AIRCRAFT GUIDING SYSTEM

Damian Albanese, Irvington, Frederick Beisel, Jr., Nutley, John Kearney, Pequannock, and Eugene Norton, Jr., Park Ridge, N.J., assignors to International Telephone and Telegraph Corporation, Nutley, N.J., a corporation of Maryland
Filed Nov. 12, 1959, Ser. No. 852,254
8 Claims. (Cl. 343—112)

This invention relates to aircraft guiding systems and more particularly to a landing system for aircraft which provides the pilot of the aircraft with instantaneous indication of the angle of elevation, the range and the direction of the aircraft relative a beacon.

The most commonly used systems for aircraft landing at airports are the instrument landing system (ILS) and the ground control approach (GCA). In the ILS system a localizer provides the lateral guidance that enables the airplane to approach the runway of the airports from the proper direction and a glide path provides an equisignal path type of guidance in the vertical plane analogous to the guidance in azimuth provided by the equisignal path of the localizer. The combination of localizer and glide path information indicated on the proper instruments in the airplane cockpit provide the pilot with sufficient information to approach the runway in the correct direction and to bring the aircraft down to earth along a glide path that will provide a safe landing. In the GCA system, the information concerning the course of the aircraft approaching the landing is obtained by presenting a picture of the instantaneous position of the aircraft in relation to the approach landing strip, by portraying on cathode-ray tube indicators the azimuth, elevation and range of the aircraft. Two narrow fan like beams of radiated energy, one scanning in azimuth and the other in elevation, locate the airplane in an area 20 degrees wide in azimuth and up to 10 degrees above the horizon in elevation within a range of 10 miles. Information concerning the approach is radioed to the pilot of the incoming aircraft and in response thereto he manipulates the aircraft controls until the aircraft lands. In both cases, the pilot through the information given him by the instruments or by radio communication from the airport control tower controls the landing of the aircraft. However, there are deficiencies in both the ILS and the GCA landing systems. In the ILS system, the pilot secures his guidance from indicators within the relatively short distance of the airport. Furthermore, he is not aware of the exact angle of elevation or the range of the aircraft from the airport. In the GCA system, the pilot has to be informed of his position relative the airport by advice radioed from the airport.

It is therefore an object of this invention to provide a system of high accuracy for landing aircraft at an airport.

A further object of this invention is to provide a landing system wherein the pilot secures instantaneous indication of the angle of elevation, the range and the direction of the aircraft relative a beacon situated at an airport or in a similar location.

A feature of this invention is the provision of an aircraft guiding system to determine the angle of elevation, the range and the direction of an aircraft relative a source of radiation. The aircraft carries first and second spaced antennas in a vertical plane to receive the radiation and derives from the received radiation a voltage equal to the rate of change of the elevation angle. Further means are provided to drive from the rate of change voltage, the angle of elevation and the range of the aircraft from the source of radiation which, of course, can be the beacon at an airport. Third and fourth spaced antennas are also carried by the aircraft in a horizontal plane orthogonal to the first plane to receive the radiation and means are further provided to derive from the received radiations at the third and fourth antennas the direction the aircraft is moving relative the source of radiation.

The above-mentioned and other features and objects of this invention will become more apparent by reference to the following description taken in conjunction with the accompanying drawings, in which:

FIG. 1 illustrates the geometry of this invention;

FIG. 2 illustrates the homing geometry from which is derived the kinematic equation used in this invention;

FIG. 3 is a block diagram of an embodiment of this invention; and

Figure 4:
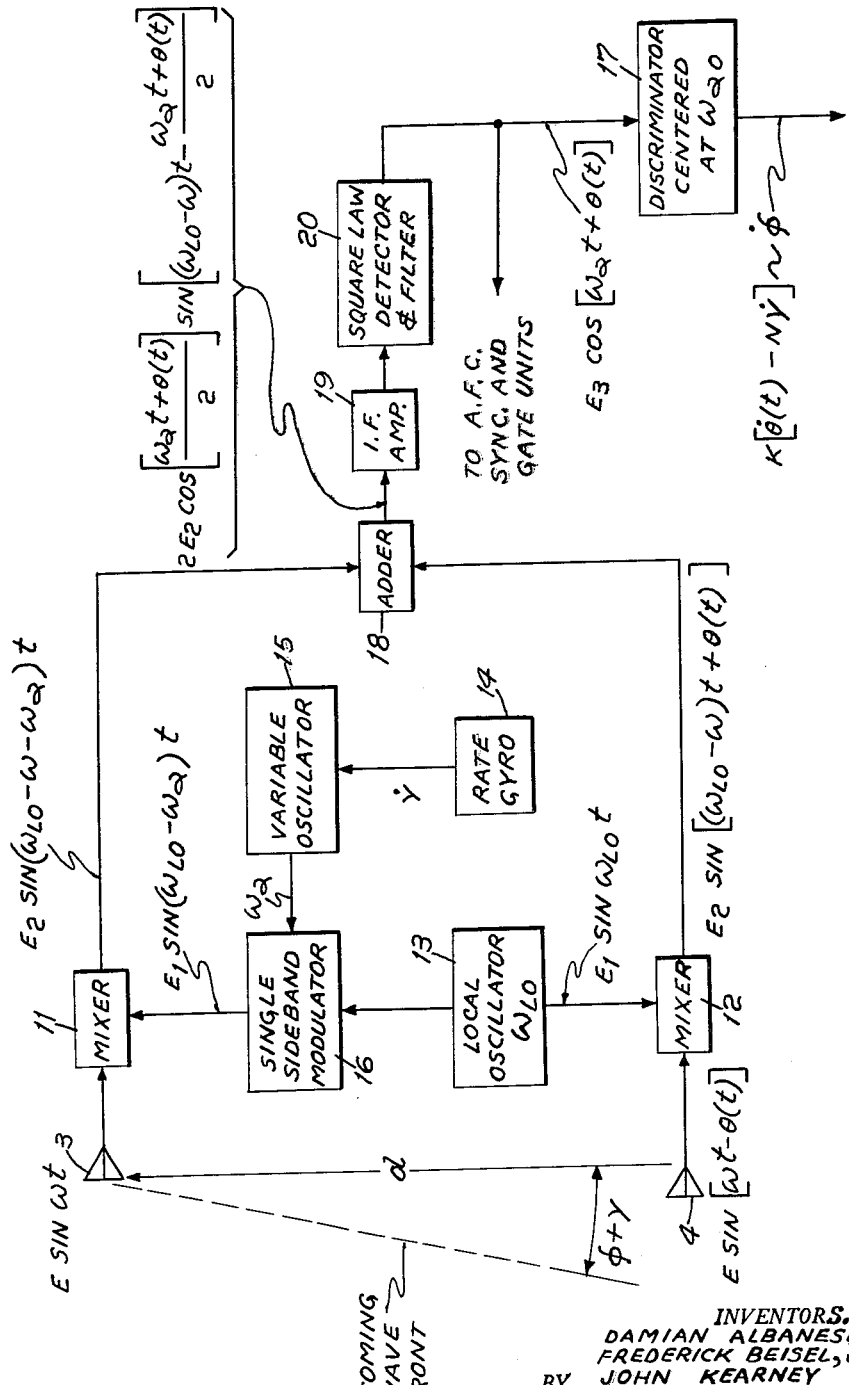
FIG. 4 is a block diagram of the phase rate interferometer circuit of this invention.

Turning now to FIG. 1, for a consideration of the geometry required for a proper understanding of this invention there is shown an elevation view 1A with an aircraft 1 moving with the velocity of $V_A$ in a direction indicated relative to a beacon 2. Fig. 1B illustrates a plan view of the elevation view 1A. The aircraft 1 carries an altimeter as part of the usual equipment carried by any aircraft, therefore its altitude is known or is continuously measured. The same can be said for the velocity of the aircraft since there is proper instrumentation for determining the velocity. From FIGS. 1A and 1B, the following equation can be derived:

(1) $$\phi = \cot^{-1} \frac{r}{h}$$

where
$\phi$ = angle of elevation
$r$ = horizontal range to the target
$h$ = height above a flat earth
Differentiating both sides with respect to time $$\frac{d\phi}{dt} = \frac{d}{dt}\left[\cot^{-1}\frac{r}{h}\right]$$

$$\frac{d\phi}{dt} = -\left[+1+\frac{r^2}{h^2}\right]^{-1}\frac{1}{h}\frac{dr}{dt}$$

or (2) $$\dot{\phi} = \left[1+\frac{r^2}{h^2}\right]^{-1}\frac{V_A}{h}$$

where $$\dot{\phi} = \frac{d\phi}{dt} \text{ and } \frac{dr}{dt} = -V_A$$

A phase rate interferometer system with its antennae located in the pitch or vertical plane of the aircraft (the line joining the two antennae is perpendicular to the assumed velocity vector) will measure the rate of change of $\phi$. Therefore, we may solve Equation 2 for range in terms of known or measurable quantities.

(3) $$r = h\sqrt{\frac{V_A}{\dot{\phi}h} - 1}$$

Knowing $r$ we may substitute in Equation 1 and solve for $\phi$ in terms of measurable or known quantities.

(4) $$\phi = \cot^{-1}\sqrt{\frac{V_A}{\dot{\phi}h} - 1}$$

This invention makes use of a phase rate interferometer homing system for navigation purposes. An interferometer homing system or navigation system is one of a class of navigation systems which senses the presence of objects or targets through the reception of electromagnetic radiation. Electrical signals suitable for reception by the appropriate receivers in the aircraft are generated by the beacon and transmitted therefrom. The interferometer system utilizes a pair of spaced antennas in one plane to receive the signals and makes use of the difference in distance traveled by radiation in arriving at these antennas which may be spaced a few wavelengths apart. Thus, the information arrives at the interferometer input antennas as a phase difference. In the interferometer navigation device of this invention, absolute phase difference between the arrived signals is discarded and use is made only of the rate of change of the phase difference. The combination of this information with information concerning the rate of rotation of the aircraft axis with respect to inertial space permits a simple proportional navigation system to be devised.

A phase rate interferometer navigation system may be used only in a dynamic situation where there is, at all times, relative motion between the aircraft and the beacon since only angular rate measurements are made. FIG. 2 shows the navigation geometry as well as the kinematic equations of motion and the simplified proportional navigation control law desired during the aircraft landing phase. It has been previously shown that proportional navigation is the desirable type of guidance system for aircraft homing purposes. The principle involved in proportional navigation is that the rate of change of the aircraft's direction of movement from a reference line in space be proportional to the rate of change of the line of sight from the aircraft to the beacon with the reference line. The kinematic equations of motion show that $$\dot{r} = -V \cos (\gamma + \phi)$$

and $$r\dot{\phi} = V \sin (\gamma + \phi)$$

The proportional navigation control equation desired is $$\dot{\gamma} = -(b+1)\dot{\phi} \text{ (with zero time lag)}$$

In the implementation of the control equations with the phase rate interferometer system, the following equations are obtained. The electrical phase difference $\theta$, between the signals received at antenna 1 and antenna 2 is $$\theta = \frac{2\pi d}{\lambda} \sin (\phi + \gamma) \text{ radians}$$

and differentiating $$\dot{\phi} = \frac{2\pi d}{\lambda} (\dot{\phi} + \dot{\gamma}) \cos (\phi + \gamma) \text{ radians/seconds}$$

It is seen, therefore, that the subtraction of the aircraft turning rate, $\dot{\gamma}$, will allow an error signal proportional to $\dot{\phi}$ to be obtained from $\theta$ by means of a frequency discriminator. The proportional navigation control law desired states that the aircraft turning rate $\dot{\gamma}$ is to be made proportional to the rate of rotation of the line-of-sight (LOS) beween the aircraft and the beacon. The implementation of this control law is performed in a phase rate interferometer navigation system by measuring the rate of change of electrical phase difference between the signals arriving at a pair of antennae in one measurement plane. However, as shown above, it is necessary to subtract the aircraft turning rate signal $\dot{\gamma}$ from $\theta$ before an error signal proportional to $\dot{\phi}$, the line-of-sight rotation rate is obtained.

FIG. 3 illustrates an embodiment of this invention where antennas 3 and 4 in a first or vertical plane are coupled to a phase rate interferometer receiver 5 which derives therefrom a voltage proportional to $\dot{\phi}$. This voltage is fed into a computer 6 which is programmed to accept the voltage equivalent to $\dot{\phi}$ and voltage representing $h$ and $V_A$ and will derive the angle of elevation and range for display to the pilot. No novel computing techniques are necessary. A computer which will perform this function when properly programmed, which one skilled in the art can readily do, is the Trice electronic computer manufactured by Packard Bell Corporation of Los Angeles, California. To determine the direction in which the aircraft is heading relative the beacon or the azimuth, a second pair of spaced antennas 7 and 8 is disposed on the aircraft in a second plane, that is, a horizontal plane, orthogonal to the plane in which lie antennas 3 and 4. In the case of the azimuth indication, a receiver 5' similar to receiver 5 is coupled to the antennas 7 and 8. This receiver will derive an error voltage when the aircraft is not pointing directly at the beacon and will provide a null voltage when the aircraft is pointing directly at the beacon. This voltage can be fed to an indicator 10 to provide the proper indication of azimuth.

Referring now to FIG. 4, there is shown a block diagram of the phase rate interferometer circuit of this invention to implement the proportional navigation control equation referred to above. A wavefront advancing towards the two antennas, 3 and 4, in a vertical plane reaches the antennas at an angle $\phi + \gamma$. The signal arriving at antenna 3 is $E \sin \omega t$ and the signal arriving at the antenna 4 is $E \sin [\omega t - \theta(t)]$ where $\theta(t)$ equals the electrical instantaneous wavefront phase delay. The two incoming signals are then fed respectively to a first mixer 11 and a second mixer 12. The delayed signal in mixer 12 is mixed with the signal output of a local oscillator 13 which has a frequency of $\omega_{LO}$, the signal output of the oscillator being $E_1 \sin \omega_{LO} t$. A rate gyroscope 14 in the appropriate plane along the pitch axis derives the rates of turn of the aircraft turning angle or $\dot{\gamma}$ and this signal is fed into a variable or deviable oscillator 15. The variable oscillator output is $\omega = \omega_{a0} + \omega \dot{\gamma}$ where $\omega_{\gamma 0}$ is a reference frequency and $\omega \dot{\gamma}$ is proportional to the gyrosignal $\dot{\gamma}$. The outputs of the local oscillator 13 and the variable oscillator 15 are both fed to a single sideband modulator 16 where the local oscillator signal is shifted in frequency by the amount $\omega_a$, to produce as the output of the single sideband modulator 16 the signal $$E_1 \sin (\omega_{LO} - \omega_a) t$$

The variable oscillator reference frequency $\omega_{a_0}$ is necessary to provide a subcarrier in order to obtain sense information, since without it a fixed aircraft turning rate would produce the same output irrespective of the direction of the line-of-sight rotation. With the reference frequency $\omega_{a_0}$, however, the rate or frequency turn deviates plus and minus around the center frequency of a discriminator 17, $\omega_{a_0}$. If the aircraft is turning so that antenna 3 is approaching the beacon 2 faster than antenna 4, the output of antenna 3 will contain a higher Doppler frequency than antenna 4 and a positive output of the discriminator 17 will be obtained. If the opposite condition occurs, i.e., antenna 4 approaches the beacon faster than antenna 3, a negative output of the discriminator will be obtained. Varying $\omega_{a0}$ by $\omega_\gamma$ is merely a convenient way of subtracting the aircraft turning rate signals. The output of the mixer 12 is the signal $$E_2 \sin [(\omega_{LO} - \omega)t + \theta(t)]$$

Containing the electrical phase difference between the two incoming signals and the output of the mixer 11 is the signal $$E_2 \sin (\omega_{LO} - \omega - \omega_a) t$$

The outputs of mixer 11 and mixer 12 are added in an adder 18 and the resulting signal is amplified in an intermediate frequency amplifier 19. The envelope of the added signals is derived in a square law detector 20 and fed to the discriminator 17 which produces a D.C. output proportional to $K[\dot{\theta}(t) - N\dot{\gamma}] \sim \dot{\phi}$. It is shown by this equation that $\dot{\gamma}$ has been subtracted out from the signal and there is then produced a signal which is proportional to $\dot{\phi}$. This voltage when fed into the computer 6 together with voltage representing $h$ and $V_A$ will produce the angle of elevation and the range.

It is to be understood that $\dot{\gamma}$ can be subtracted from the output of the discriminator instead of in the mixer 11, by adding the output of the rate gyro 14 to the output of the discriminator; it is a matter of convenience where the subtraction is to be made. Phase rate interferometer receiver 5' is similar to receiver 5 with a rate gyro to compensate for the aircraft turning angle along the yaw axis, that is similarly subtracted out from the received signals. It is only necessary to derive the sense and magnitude of azimuth from this receiver and indicate it on the indicating device.

While we have described above the principles of our invention in connection with specific apparatus, it is to be clearly understood that this description is made only by way of example and not as a limitation to the scope of our invention as set forth in the objects thereof in the accompanying claims.

We claim:

1. An aircraft guiding system to determine the angle of elevation, the range and direction of an aircraft relative a source of radiation, said aircraft having height determining means and velocity determining means, comprising first and second spaced antennas in a first plane carried by said aircraft to receive said radiation, means to derive from said received radiation a voltage equal to the rate of change of said elevation angle and means to derive from said rate of change voltage and from voltages representing the height and velocity of said aircraft, said angle of elevation and said range of said aircraft from said source, third and fourth spaced antennas carried by said aircraft in a second plane orthogonal to said first plane to receive said radiations and means to derive from said last-mentioned received radiations the direction said aircraft is moving relative said source.

2. An aircraft guiding system to determine the angle of elevation, the range and direction of an aircraft relative a source of radiation, said aircraft having height determining means and velocity determining means, comprising first and second spaced antennas in a first plane carried by said aircraft to receive said radiation, means to derive from the received radiation at said first and second antennas a first voltage proportional to the rate of change of the angle of arrival of said radiations at said first and second antennas, means to derive from said rate of change of arrival angle voltage in said first plane and from voltages representing the height and velocity of said aircraft, said angle of elevation and said range of said aircraft from said source, third and fourth spaced antennas carried by said aircraft in a second plane orthogonal to said first plane to receive said radiations, means to derive from the received radiation of said third and fourth antennas a second voltage proportional to the rate of change of the angle of arrival of said radiation at said third and fourth antennas and means to derive from said rate of change of angle arrival voltage in said second plane the direction said aircraft is moving relative said source of radiation.

3. An aircraft guiding system according to claim 2 further comprising means to determine the direction of the changes in the angle of arrival of said radiation in said first and second planes.

4. An aircraft guiding system to determine the angle of elevation, the range and direction of an aircraft relative a source of radiation, said aircraft having height determining means and velocity determining means comprising first and second spaced antennas in a first plane carried by said aircraft to receive said radiation, means to derive from the received radiation at said first and second antennas a first voltage proportional to the rate of change of the angle of arrival of said radiations at said first and second antennas, means to derive from said rate of change of arrival angle voltage in said first plane and from voltages representing the height and velocity of said aircraft, said angle of elevation and said range of said aircraft from said source, third and fourth spaced antennas carried by said aircraft in a second plane orthogonal to said first plane to receive said radiations, means to derive from the received radiation of said third and fourth antennas a second voltage proportional to the rate of change of the angle of arrival of said radiation at said third and fourth antennas and means to derive from said rate of change of angle arrival voltage in said second plane the direction said aircraft is moving relative said source of radiation, means to determine the direction of the changes in the angle of arrival of said radiation in said first and second planes, means to subtract from said first voltage proportional to the rate of change of said angle of arrival a voltage proportional to the rate of change of the aircraft turning angle in the first plane and means to subtract from said second voltage proportional to the rate of change of said angle of arrival a voltage proportional to the rate of change of the aircraft turning angle in said second plane.

5. An aircraft guiding system to determine the angle of elevation, the range and direction of an aircraft relative a source of radiation, said aircraft having height determining means and velocity determining means comprising first and second spaced antennas in a first plane carried by said aircraft to receive said radiation, means to derive from the received radiation at said first and second antennas a first voltage proportional to the rate of change of the angle of arrival of said radiations at said first and second antennas, means to derive from said rate of change of arrival angle voltage in said first plane and from voltages representing the height and velocity of said aircraft, said angle of elevation and said range of said aircraft from said source, third and fourth spaced antennas carried by said aircraft in a second plane orthogonal to said first plane to receive said radiations, means to derive from the received radiation of said third and fourth antennas a second voltage proportional to the rate of change of the angle of arrival of said radiation at said third and fourth antennas, means to derive from said rate of change of angle arrival voltage in said second plane the direction said aircraft is moving relative said source of radiation, first and second mixers coupled respectively to said first and second antennas, a first local oscillator coupled to said first mixer to produce as the output of said first mixer a signal containing the phased difference information of the angle of arrival of said radiation at said first and second antennas, a first variable oscillator, a first rate gyro for detecting the rate of turn of said aircraft in said first plane, means coupling the output of said first rate gyroscope to said first variable oscillator whereby the resonant frequency of said first variable oscillator is varied by the output of said first rate gyroscope, a first single side band modulator means coupling the output of said first variable oscillator and said first local oscillator to said first modulator, means coupling the output of said first modulator to said second mixer to produce as the output of said second mixer a signal containing information of the sense of the rate of change of said arrival angle in said first plane and the magnitude of said rate of turn of said aircraft, a first adder, means coupling the output of said first and second mixers to said first adder, a first square law detector, a first intermediate frequency amplifier coupling the output of said first adder to said first square law detector to derive the envelope of the combined signal output of said first adder, a first discriminator tuned to the resonant frequency of said first variable oscillator whereby there is derived a voltage as the output of said first discriminator the magnitude of said voltage being proportional to the rate of change of said angle of arrival of said radiation in said first plane and the phase of said voltage is proportional to the sense of the rate of change in said arrival angle.

6. An aircraft guiding system to determine the angle of elevation, the range and direction of an aircraft relative a source of radiation, said aircraft having height determining means and velocity determining means comprising first and second spaced antennas in a first plane carried by said aircraft to receive said radiation, means to derive from the received radiation at said first and second antennas a first voltage proportional to the rate of change of the angle of arrival of said radiations at said first and second antennas, means to derive from said rate of change of arrival angle voltage in said first plane and from voltages representing the height and velocity of said aircraft said angle of elevation and said range of said aircraft from said source, third and fourth spaced antennas carried by said aircraft in a second plane orthogonal to said first plane to receive said radiations, means to derive from the received radiation of said third and fourth antennas a second voltage proportional to the rate of change of the angle of arrival of said radiation at said third and fourth antennas and means to derive from said rate of change of angle arrival voltage in said second plane the direction said aircraft is moving relative said source of radiation, third and fourth mixers coupled respectively to said third and fourth antennas, a second local oscillator coupled to said third mixer to produce as the output of said third mixer a signal containing the phase difference information of the angle of arrival of said radiation at said third and fourth antennas, a second variable oscillator, a second rate gyro for detecting the rate of turn of said aircraft in said second plane, means coupling the output of said second rate gyroscope to said second variable oscillator whereby the resonant frequency of said second variable oscillator is varied by the output of said second rate gyroscope, a second single side band modulator means coupling the output of said second variable oscillator and said second local oscillator to said modulator, means coupling the output of said modulator to said fourth mixer to produce as the output of said fourth mixer a signal containing information of the sense of the rate of change of said arrival angle in said second plane and the magnitude of said rate of turn of said aircraft, a second adder, means coupling the output of said third and fourth mixers to said second adder, a second square law detector, a second intermediate frequency amplifier coupling the output of said second adder to said second square law detector to derive the envelope of the combined signal output of said second adder, a second discriminator tuned to the resonant frequency of said variable oscillator whereby there is derived a voltage as the output of said discriminator the magnitude of said voltage being proportional to the rate of change of said angle of arrival of said radiation in said second plane and the phase of said voltage is proportional to the sense of the rate of change in said arrival angle.

7. An aircraft guiding system according to claim 5 further including means coupling the output of said first discriminator to a computer to derive as the output of said computer the angle of elevation and range of said aircraft relative said source of radiation.

8. An aircraft guiding system according to claim 6 further including indicating means and means coupling the output of said second discriminator to said indicating means whereby said indicating means will indicate the direction said aircraft is moving relative to said source.

References Cited in the file of this patent
UNITED STATES PATENTS

| | | |
|---|---|---|
| 2,496,809 | Moseley | Feb. 7, 1950 |
| 2,613,351 | Lang | Oct. 7, 1952 |
| 2,636,167 | Schuck | Apr. 21, 1953 |
| 2,646,564 | Perilhou | July 21, 1953 |
| 2,968,034 | Cafarelli | Jan. 10, 1961 |
| 3,025,520 | Werner et al. | Mar. 13, 1962 |